June 26, 1923.

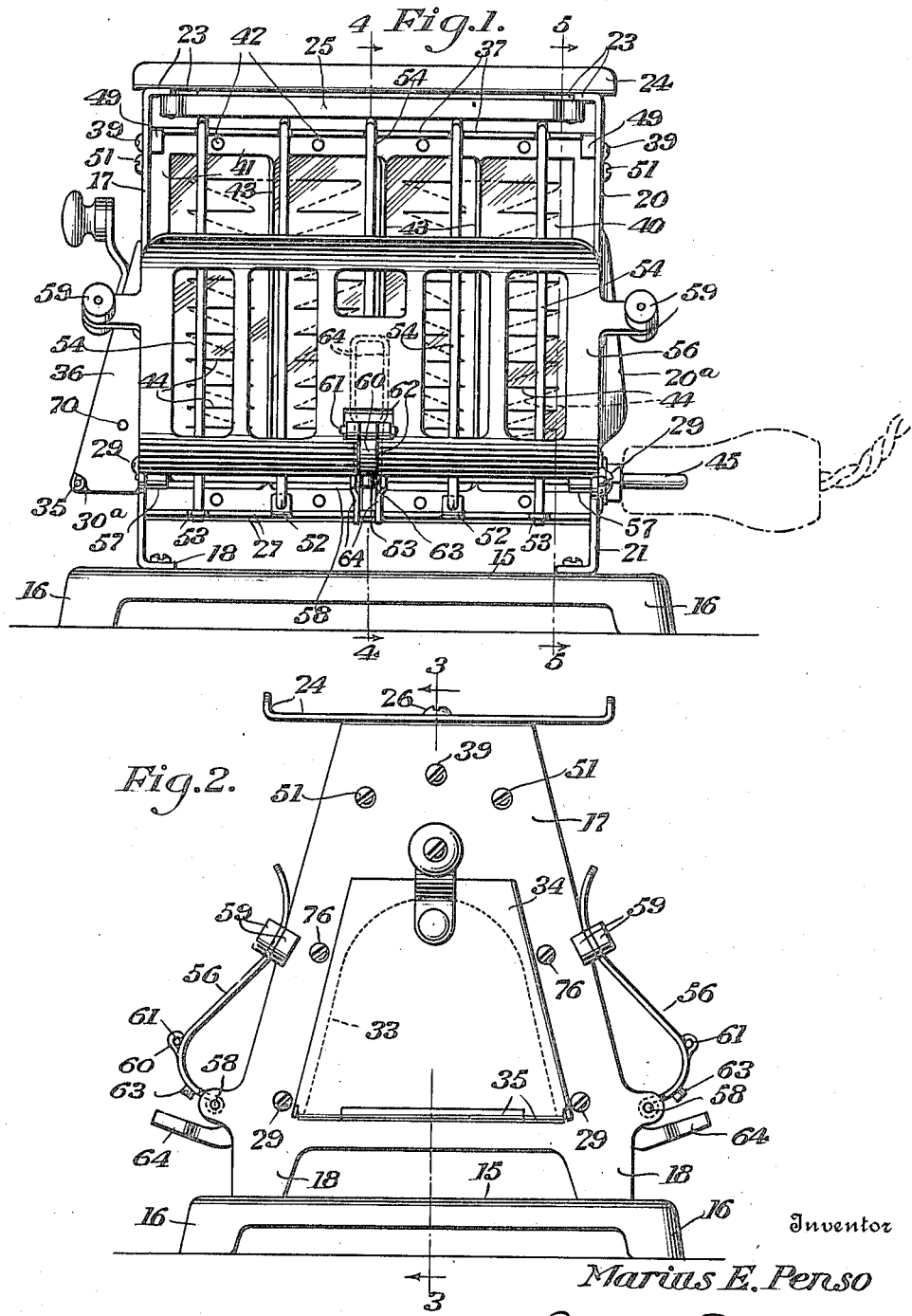

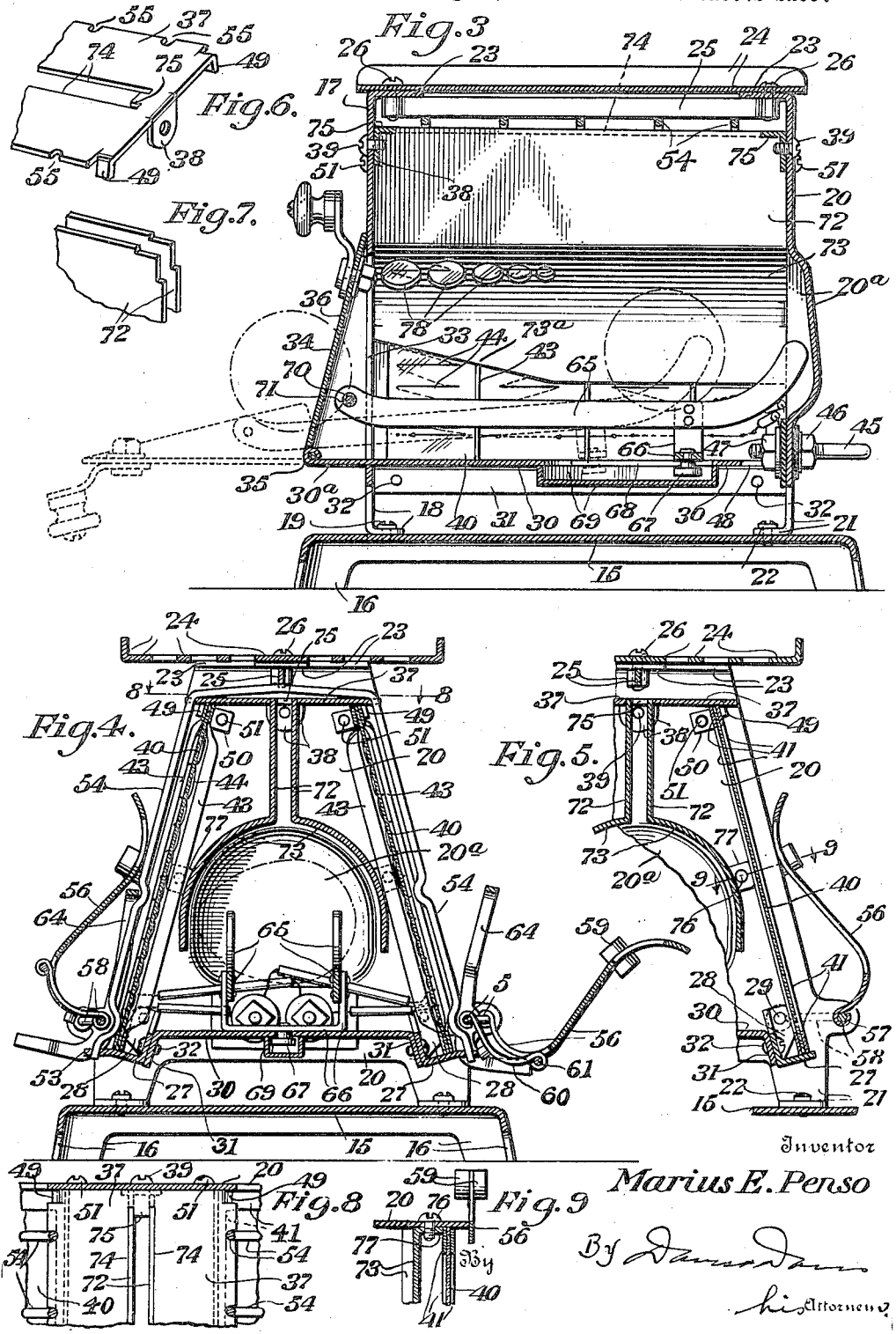

M. E. PENSO

ELECTRIC COOKING DEVICE

Filed Aug. 9, 1921   3 Sheets-Sheet 3

Inventor
Marius E. Penso
By
his Attorneys.

Patented June 26, 1923.

1,460,140

UNITED STATES PATENT OFFICE.

MARIUS E. PENSO, OF NEW YORK, N. Y., ASSIGNOR TO NATIONAL INDICATOR COMPANY, OF LONG ISLAND CITY, NEW YORK, A CORPORATION OF NEW YORK.

ELECTRIC COOKING DEVICE.

Application filed August 9, 1921. Serial No. 490,945.

*To all whom it may concern:*

Be it known that I, MARIUS E. PENSO, a citizen of the United States, and resident of the borough of Bronx, in the county of Bronx, city and State of New York, have invented certain new and useful Improvements in Electric Cooking Devices, of which the following is a specification.

This invention relates to improvements in electrically heated cooking devices, and has for one of its objects to provide a simple, compact, and readily portable device adapted to perform cooking operations of different character simultaneously. Other objects of the invention are to provide an apparatus for simultaneously toasting a plurality of slices of bread and cooking eggs; to provide an efficient combined electric oven and toaster of small size and relatively large capacity; and to provide efficient means for concentrating and evenly distributing radiated heat around a plurality of articles, such as eggs, for the purpose of rapidly and uniformly cooking the articles.

To the above and other ends, which will hereinafter appear, my invention consists in the features of construction, arrangements of parts, and combinations of devices set forth in the following description and particularly pointed out in the appended claims.

Figure 10:
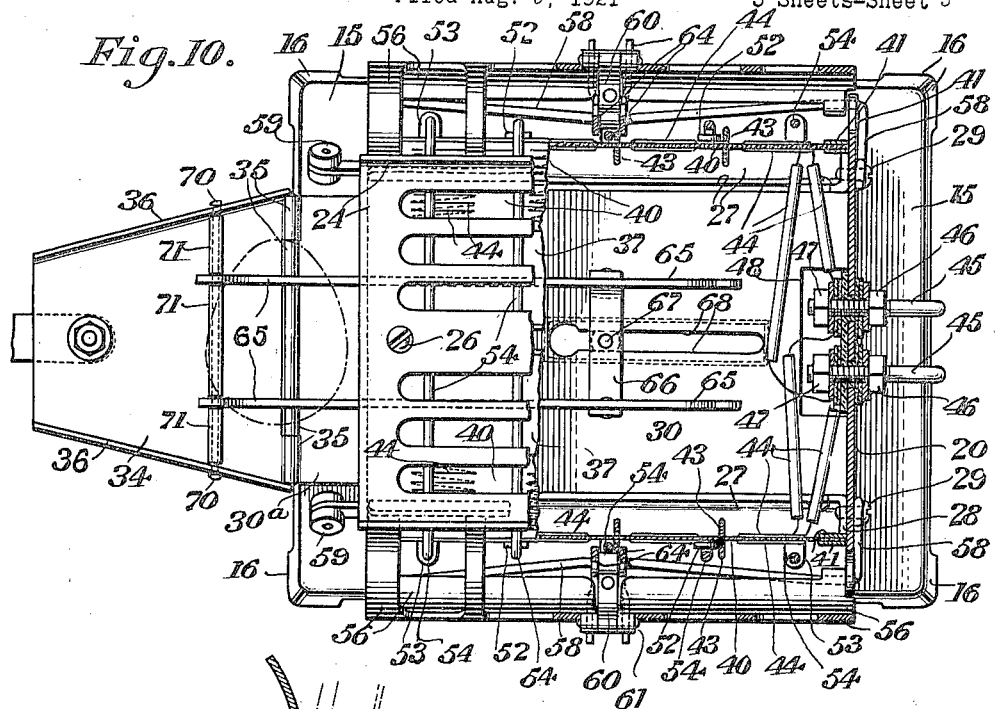
Figure 11:
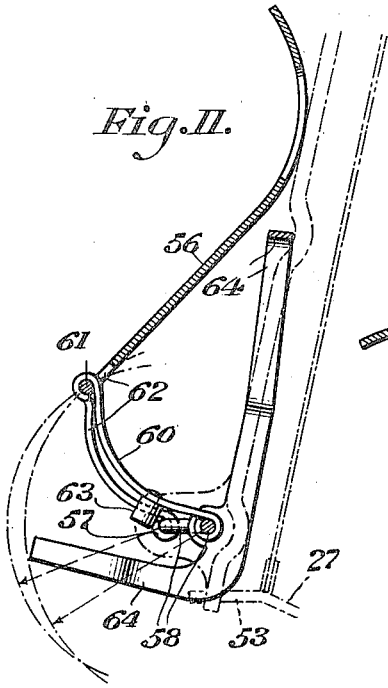
Figure 12:
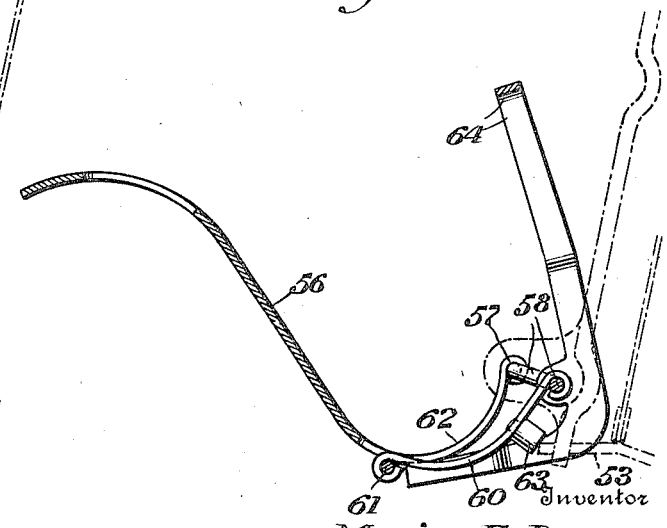

In the accompanying drawings, in which the preferred embodiment of my invention is illustrated, Figure 1 is a side elevation of the device;

Fig. 2 a front elevation thereof;

Fig. 3 a vertical sectional view on the line 3—3 of Fig. 2;

Fig. 4 a vertical sectional view on the line 4—4 of Fig. 1, one of the toast holders being shown swung open;

Fig. 5 is a fragmentary vertical sectional view on the line 5—5 of Fig. 1;

Fig. 6 a detail perspective view showing one end of the top wall of the oven;

Fig. 7 a detail perspective view showing the formation of the ends of the two sections of the heat deflector or distributing hood at the point of connection thereof with the top wall of the oven;

Fig. 8 a detail sectional view on the line 8—8 of Fig. 4;

Fig. 9 a detail sectional view on the line 9—9 of Fig. 5;

Fig. 10 a plan view of the device, the oven door being shown open and the upper portion of the device being partly broken away; and Figs. 11 and 12 detail sectional views showing one of the toast holders and ejecting devices in closed and open positions, respectively, said views being taken on the same line as Fig. 4.

The base of the device comprises a flat rectangular metal plate 15 provided with integral, downwardly extending angular corner portions forming feet or standards 16. A vertical metallic front wall 17 is supported on the base by means of two angular feet 18 formed integrally with said wall and fastened to plate 15 by screws 19. A vertical metallic rear wall 20 is supported on the base by feet 21 fastened to plate 15 by screws 22. The walls 17 and 20 are formed with inwardly extending flanges 23 at their upper edges, on which the ends of a slotted metal plate or grid 24 are supported, said plate and a bar 25, the purpose of which is hereinafter described, being held to flanges 23 by screws 26 and serving to brace the upper ends of the walls 17 and 20. Walls 17 and 20 are connected at opposite sides thereof adjacent their lower edges by a pair of angle irons or metal brackets 27, said brackets having outwardly turned end flanges 28 on the upwardly extending webs thereof, fastened to walls 17 and 20 by screws 29.

The bottom wall of the oven is formed by a flat metal plate 30 having downwardly and outwardly extending side flanges 31 secured by screws 32 to the upwardly and inwardly extending webs of angle irons 27. Bottom wall 30 of the oven has a short extension 30$^a$ projecting through an opening or doorway 33 formed in wall 17. A metal door 34 is hinged at 35 to the outer edge of extension 30$^a$, said door being formed with tapered side flanges 36 the inner edges of which abut against wall 17 when the door is closed. The flanged door and extension 30$^a$ of wall 30 form an extension or outward bulge in the front of the oven when the door is closed, and wall 20 is formed with an outwardly bulged portion 20$^a$ opposite the doorway 33. The purpose of these bulges or extensions in the front and rear ends of the oven is hereinafter described. The top wall of the oven is formed by a flat metal plate 37 secured at its ends to walls 17 and 20 by screws 39 which pass through said walls and through lugs 38 formed on said plate.

The heat-supplying means forms the side walls of the oven. In the construction shown the heat-supplying means comprises two electric heating units located at opposite sides of the device, each of said units being so constructed as to radiate heat at both the inner and outer sides thereof. It will be obvious that instead of a single unit at each side, a plurality of units connected in series may be provided, and that the electric heating units may be constructed in various ways. As shown, each electric heater or unit comprises a sheet of mica 40 supported between two rectangular metal frames 41 secured together by rivets 42, said frames being formed with intermediate bars or ribs 43, and a resistance wire 44 laced or passed back and forth through openings in the mica sheet. Any suitable arrangement of winding or lacing of the resistance wire on its insulating support may be employed, the arrangement shown affording a uniform distribution of portions of the wire over both sides of sheet 40. The two ends of wire 44 of each heater unit are connected to two wire terminals or plug contacts 45 which extend through apertures in wall 20. Terminals 45 are held to the wall by clamping nuts 46 and 47 and said terminals and nuts are insulated from the wall. The ends of the wires extending from the mica sheets to the plugs 45 are preferably covered with insulating material, as shown, to prevent these portions of the wires from unduly increasing the amount of heat at the inner end of the oven. Bottom wall 30 of the oven is provided with an opening 48 to permit air to pass upwardly into the oven. Cold air entering through opening 48 keeps the terminals from becoming excessively heated and also allows a circulation of air through the oven as hereinafter described. Contacts 45 are adapted for connection with a suitable connector plug as indicated in dotted lines in Fig. 1.

The lower edges of the frames of the heating elements or units rest on the outwardly extending webs of angle-iron brackets 27, and the upper edges of said frames engage under the top wall 37 of the oven which overhangs the heating elements at its side edges. The heating elements incline inwardly toward each other from the lower to the upper edges thereof. Said elements are held against nuts 50 on screws 51 at their upper edges by downwardly bent lugs 49 on wall 37, and are held against the outer edges of flanges 28 on brackets 27 by upturned lugs 52 on the outwardly extending webs of said brackets. A plurality of wires 54 of substantially inverted U-shape extend over wall 37 and downwardly adjacent the outer sides of the two heating elements, said wires engaging in notches 55 in the edge of wall or top plate 37 and having their lower ends engaged in lugs 52 and 53 on brackets 27. The upper transverse portions of wires 54 are engaged by bar 25 which serves to lock the wires in place. The wires 54 form a duplex grid for supporting slices of bread closely adjacent the outer sides of the heating elements.

For supporting and holding slices of bread against the inclined grids 54 I provide pivoted toast supports 56, each of which comprises a slotted or grate-like metal plate having its lower edge curved inwardly to form a supporting surface for the lower edge of the slice of bread, and provided at its ends with lugs bent to form tubes 57 through which a hinge wire 58 passes. Hinge wire 58 is bowed inwardly intermediate its ends and is formed of resilient or spring wire stock, one end of said wire passing through an aperture in front wall 17 and the other end passing through wall 20 and being bent around screw 29. Each holder 56 is formed with lateral extensions at its side edges provided with finger pieces 59 of heat-insulating material. A rigid link 60 is pivotally connected at its ends to a pivot pin 61 held to the toast-holder 56 and to spring hinge wire 58, the holder being provided with a slot 62 through which the link is adapted to pass as the holder is swung open and shut. Link 60 and wire 58 serve as a double-acting spring hinge adapted to hold the pivoted toast support 56 yieldably in either closed or open position. It will be obvious that the bowed spring wire and the link will urge the holder 56 toward the grid when pivot point 61 is above a horizontal plane through the pivotal axis of the holder, i. e. the hinges 57, and will urge the holder outwardly and downwardly after a movement of the holder sufficient to carry point 61 below said plane, the link gradually straightening or tensioning the bowed wire as the holder is swung out and down until point 61 crosses said plane, whereupon the spring wire will be free to resume its bowed form and will snap holder 56 down to the limit of its movement. A stop 63 is provided on link 60 adapted to engage the central lug 53 on bracket 27 to limit the outward and downward movement of the holder 56, as shown in Figs. 4 and 12. It will be obvious from an inspection of Fig. 11 that holders 56 may have a large outward movement before point 61 crosses the plane through hinges 57 so that slices of bread of varying thickness may be yieldably held against the grids 54. A toast ejector 64, having two spaced members of bell-crank form connected at their upper ends, is povotally supported on each wire 58, the spaced members of the ejector straddling the link 60 and being held against lateral movement by the link. The upwardly extending arms of the ejector are adapted to engage the inner side of the piece of toast and are rocked outwardly to throw the toast away from the grid 54 upon the holder 56 by reason of the engagement of holder 56 with the outwardly extending arms of the ejector during the final portion of the opening movement of the holder.

The oven is especially adapted for use in cooking eggs in the shell, but may be used for cooking or heating other small objects. The eggs or other articles are supported in the oven above the bottom wall 30 upon a rack or charging and discharging frame comprising a pair of parallel rails or bars 65 having upturned outer and inner end portions and rigidly connected together adjacent their inner ends by a U-shaped slide 66. The upstanding arms of slide 66 are riveted to bars 65 and the transverse member thereof slides upon the upper surface of bottom wall 30 of the oven. Slide 66 is guided by a headed stud 67 secured thereto, the shank of said stud extending through a slot 68 in wall 30. A box-like cap or closure 69, welded or otherwise secured to the under side of wall 30, prevents inflow of cold air into the oven through the slot 68. Bars 65 are pivotally connected at their outer ends to a rod 70 which is held at its ends to the side flanges 36 of door 34 above the hinges 35. Spacing sleeves 71 are provided on rod 70 to prevent lateral movement of the bars 65. The parts are so arranged that when the door 34 is closed the main body portions of bars 65 are horizontal and will support a plurality of eggs in the oven spaced from the top, bottom, side and end walls of the oven so that hot air has access to the entire exterior surfaces of the eggs.

In order to concentrate and uniformly distribute the heat around all of the eggs I provide a deflector or distributer hood comprising two sheet metal members having vertical portions 72 and lower outwardly and downwardly curved portions 73. Portions 73 form a substantially semi-cylindrical hood extending from wall 17 to wall 20 overhanging the egg-supporting rack and adapted to partly enclose the eggs. The portions 72 are spaced apart to form a flue, the upper edges of said portions being engaged in a slot 74 in wall 37 and held spaced apart by lugs 75 at the ends of said slot. The hood is supported by the interlocked connection of parts 72 with wall 37 and by fastening screws 76 which extend through walls 17 and 20 and through lugs 77 on portions 73 of the hood. Lugs 77 also assist nuts 50 and flanges 28 in holding the frames of the heating elements against inward movement.

Air heated in the oven will pass under the eggs and between and around the eggs and then up through the flue formed by parts 72 of the hood. The hood shields the eggs from direct radiation of heat from the heating elements and concentrates the hot air rising from the lower part of the oven around the eggs as it passes upwardly to the flue, thus insuring uniform cooking of all the eggs and also preventing excessive heating of any one part of an egg which might result in cracking of the egg shell. The flanged door and the bulge 20ª in wall 20 permit free circulation of air within the hood around the eggs at each end of rack 65, said flanged door and bulge forming offsets in the front and rear ends of the oven at each end of the hood. Owing to leakage of air around door 35 it may be desirable to provide means whereby a greater amount of direct radiated heat may be admitted at the forward end of the hood to insure uniform cooking of the eggs. For this purpose the lower edges of portions 73 may be cut away on a diagonal line as shown at 73ª, and a series of holes 78 may be provided in the forward ends of portions 73, said holes decreasing in diameter from the forward end of the hood. If desired either of these expedients may be employed alone, or other suitable means may be provided for insuring uniform heating of the eggs. Air rising through the flue 72 and from the outer sides of the heaters may be utilized for heating articles or keeping cooked eggs or toasted slices of bread warm, said articles, or receptacles therefor, being supported on the slotted plate or grid 24. The upturned ends of bars 65 prevent eggs or other articles from rolling or sliding off the article supporting rack. When door 34 is swung outward and downward to its open horizontal position it pulls the article support outward partly through the doorway 33, and also carries rod 70 downward thereby tilting the article support, so that the eggs or other articles will roll or slide forward and downward along bars 65 through the doorway where they may be readily removed. The shank of stud 67 is sufficiently long to permit the tilting of the article support as shown in dotted lines in Fig. 3. The door 34 inclines upwardly and inwardly when closed and is held in closed position by its own weight as well as by reason of its connection with the article supporting frame.

What I claim is:

1. A device of the class set forth comprising a plurality of upstanding electric heating units, a supporting frame for said units, said units and frame forming an oven heated by said units, and means for supporting slices of bread adjacent the outer sides of said units.

2. In a device of the class set forth, the combination of an oven having open sides, electric heating elements located at the open sides of said oven, and means for supporting slices of bread at the outer sides of said heating elements.

3. In a device of the class set forth the combination of an oven, electric heating elements located at different sides of the oven and adapted to heat the same and also radiate heat outwardly, and toast supporting means at the outer sides of the heating elements.

4. An electrically heated cooking device comprising an oven having upstanding walls supporting resistance wire at both sides thereof, and means for supporting slices of bread at the outer sides of said walls.

5. An electrically heated cooking device comprising an oven having oppositely disposed open sides, electric heating elements closing the open sides of the oven and supported on said oven, grids mounted on the oven at the outer sides of the heating elements, and toast-holders pivotally held to the oven to swing toward and from the grids.

6. In an electric toaster, the combination of a support, electric heating means mounted on the support in an upstanding position, a toast clamp pivotally held at its lower end to the support, and means for yieldably holding the clamp in either clamping or open position.

7. In a toaster, the combination of electric heating means, a grid adapted to support slices of bread adjacent the heating means, a resilient bowed rod extending longitudinally of the grid, means for supporting said rod adjacent its ends and holding it against rotation, a bread clamp pivotally supported on said rod at opposite sides of the high point of the arc of the rod to swing toward and from the grid, means for limiting the opening movement of the clamp, and a link pivotally connected with the clamp and with said rod at the high point of the arc of the rod and shiftable from a point at one side of the pivotal axis of the clamp when the clamp is in closed position to a point at the opposite side of said pivotal axis when the clamp is in open position.

8. In a device of the class set forth, the combination of an oven having a door, means for supporting toast at the sides of the oven, electric heating means interposed between the toast supporting means and the interior of the oven, an article supporting rack in said oven, and a connection between said rack and the oven door for shifting the rack in and out through the door opening.

9. In a device of the class set forth, the combination of an oven having a door, means for supporting toast at the sides of the oven, electric heating means interposed between the toast supporting means and the interior of the oven, an article supporting rack in said oven, and a connection between said rack and the oven door for sliding the rack outwardly and depressing the forward end of the rack when the door is opened.

10. In an electrically heated cooking device, the combination of an oven, electric heating means therefor, an article holding rack in said oven, a hood overhanging said rack, said oven having an air inlet, and a flue extending from said hood to the exterior of the oven.

11. In a device of the class set forth, the combination of a frame, a plurality of upstanding electric heating elements supported on said frame, egg supporting means located between the inner sides of said heating elements, and toast-supporting means at the outer sides of said heating elements.

12. In a device of the class set forth, the combination of a frame, a plurality of upstanding electric heating elements supported on said frame, egg supporting means located between the inner sides of said heating elements, toast-supporting means at the outer sides of said heating elements, and a hood supported on the frame overhanging said egg-supporting means and provided with an air outlet at the top thereof.

13. In a toaster, the combination of electric heating means, a grid adapted to support slices of bread adjacent the heating means, a resilient bowed rod extending longitudinally of the grid, means for supporting said rod adjacent its ends and holding it against rotation, a bread clamp pivotally supported on said rod at opposite sides of the high point of the arc of the rod to swing toward and from the grid, means for limiting the opening movement of the clamp, a link pivotally connected with the clamp and with said rod at the high point of the arc of the rod and shiftable from a point at one side of the pivotal axis of the clamp when the clamp is in closed position to a point at the opposite side of said pivotal axis when the clamp is in open position, and a toast ejector of bell-crank form pivoted on said rod having one arm interposed between the grid and clamp and its other arm located in the path of opening movement of the clamp.

14. In a device of the class set forth, the combination of an oven having an air inlet and also provided with an air outlet in its top wall, electric heating means for heating air circulating through the oven, a hood spaced from the bottom of the oven, a flue connecting the hood with the air outlet, a support for articles to be warmed mounted on the top of the oven over said air outlet, and a rack for supporting articles above the bottom of the oven within said hood.

15. A cooking appliance comprising an oven, means for supporting articles to be cooked in an elevated position in the oven with substantially their entire surface areas exposed, electric heating means arranged at opposite sides of said supporting means, and a hood in the oven arranged over the supporting means and having side walls interposed between the heating means and articles on the support.

16. A cooking appliance comprising an oven, means for supporting articles to be cooked in an elevated position in the oven with substantially their entire surface areas exposed, electric heating means arranged at opposite sides of said supporting means, a hood in the oven arranged over the supporting means and having side walls interposed between the heating means and articles on the support, said oven and hood having air outlets in the top thereof, and a flue connecting said air outlets, said oven being provided with an air inlet.

17. A cooking appliance comprising an oven, means for supporting articles to be cooked in an elevated position in the oven with substantially their entire surface areas exposed, electric heating means arranged at opposite sides of said supporting means, a hood in the oven arranged over the supporting means and having side walls interposed between the heating means and articles on the support, one end of the hood being open, and a door for the oven at the open end of the hood, said hood being provided adjacent its open end with apertures increasing in area toward the open end of the hood.

18. A cooking appliance comprising an electrically heated oven having a door hinged at its lower edge adjacent the bottom of the oven, an article-supporting rack in the oven pivotally supported at its forward end on the door and spaced at said pivoted forward end above the bottom of the oven, and means slidably and tiltably engaging the bottom of the oven for supporting the rear portion of the rack above the bottom of the oven.

19. A cooking appliance comprising an electrically heated oven having a door hinged at the bottom of the oven to swing outwardly and downwardly, parallel article-supporting members pivotally held at their forward ends to the door above the bottom of the oven, and a support slidably and tiltably engaging the bottom of the oven, said members being rigidly held to said support adjacent their rear ends and maintained above and parallel with the bottom of the oven by said support and door when the door is closed.

20. A combined cooking and toasting appliance comprising end walls, a top wall, a bottom wall, side walls, electric heating means at both faces of the side walls, a door opening in one of the end walls, a door for closing said opening, grids at the outer faces of the side walls, and means for supporting slices of bread at the outer sides of the grids.

21. A combined oven and toaster comprising end walls, a top wall, a bottom wall, side walls of insulating material, electric resistors carried by the side walls and having parts thereof located at both faces of their supporting walls, toast-holders pivotally supported to swing toward and from the outer faces of the side walls, a substantially semicylindrical hood having its open lower side spaced above the bottom wall and its ends abutting the end walls, a doorway in one end wall communicating with one end of the hood, and a door for said doorway.

22. A combined oven and toaster comprising end walls, a top wall, a bottom wall, side walls of insulating material, electric resistors carried by the side walls and having parts thereof located at both faces of their supporting walls, toast-holders pivotally supported to swing toward and from the outer faces of the side walls, a substantially semicylindrical hood having its open lower side spaced above the bottom wall and its ends abutting the end walls, a doorway in one end wall communicating with one end of the hood, a door for said doorway, an egg-supporting rack extending longitudinally of the hood and located beneath the hood, and means for supporting said rack above the bottom wall to move in and out through the doorway.

23. A combined oven and toaster comprising end walls, a top wall, a bottom wall, side walls of insulating material, electric resistors carried by the side walls and having parts thereof located at both faces of their supporting walls, toast-holders pivotally supported to swing toward and from the outer faces of the side walls, a substantially semicylindrical hood having its open lower side spaced above the bottom wall and its ends abutting the ends walls, a doorway in one end wall communicating with one end of the hood, a door for said doorway, an egg-supporting rack extending longitudinally of the hood and located beneath the hood, means for supporting said rack above the bottom wall to move in and out through the doorway, said top wall and said hood having long narrow air outlets extending longitudinally thereof, a flue connecting the air outlets, and a warmer rack supported above the top wall and overlying the air-outlet in said wall and projecting laterally beyond the side walls.

24. A combined oven and toaster comprising end walls, a top wall, a bottom wall, side walls of insulating material, electric resistors carried by the side walls and having parts thereof located at both faces of their supporting walls, toast-holders pivotally supported to swing toward and from the outer faces of the side walls, a substantially semicylindrical hood having its open lower side spaced above the bottom wall and its ends abutting the end walls, a doorway in one end wall communicating with one end of the hood, a door for said doorway, an egg-supporting rack extending longitudinally of the hood and located beneath the hood, means for supporting said rack above the bottom wall to move in and out through the doorway, said top wall and said hood having long narrow air outlets extending longitudinally thereof, a flue connecting the air outlets, a warmer rack supported above the top wall and overlying the air-outlet in said wall and projecting laterally beyond the side walls, a plurality of spaced grid members of inverted U-shape embracing the top and side walls, and means for holding said grid members in fixed spaced relation.

In testimony whereof I hereunto affix my signature.

MARIUS E. PENSO.